US010751968B2

(12) United States Patent
Hauk et al.

(10) Patent No.: US 10,751,968 B2
(45) Date of Patent: Aug. 25, 2020

(54) CYLINDRICAL THERMAL PROTECTION SHEATH

(71) Applicant: VSL International AG, Koniz (CH)

(72) Inventors: Thorsten Hauk, Bern (CH); Daniel Knight, Hougang St (SG); Mark Rebentrost, Glentree (SG)

(73) Assignee: VSL International AG, Koniz (CH)

(*) Notice: Subject to any disclaimer, the term of this patent is extended or adjusted under 35 U.S.C. 154(b) by 669 days.

(21) Appl. No.: 14/945,146

(22) Filed: Nov. 18, 2015

(65) Prior Publication Data

US 2017/0001404 A1    Jan. 5, 2017

(30) Foreign Application Priority Data

Jun. 30, 2015    (CH) ..................... 00941/15

(51) Int. Cl.
| | | |
|---|---|---|
| B32B 1/08 | (2006.01) |
| B32B 5/26 | (2006.01) |
| E01D 19/16 | (2006.01) |
| E01D 19/14 | (2006.01) |
| E04B 1/78 | (2006.01) |
| E02D 5/80 | (2006.01) |

(52) U.S. Cl.
CPC .................. *B32B 1/08* (2013.01); *B32B 5/26* (2013.01); *E01D 19/14* (2013.01); *E01D 19/16* (2013.01); *E02D 5/80* (2013.01); *E04B 1/78* (2013.01); *B32B 2262/10* (2013.01); *B32B 2307/304* (2013.01); *B32B 2419/00* (2013.01); *B32B 2571/00* (2013.01); *B32B 2597/00* (2013.01)

(58) Field of Classification Search
CPC ......... E04B 1/78; B32B 1/08; B32B 2307/04; B32B 2571/04; B32B 2597/00; B32B 5/26; B32B 2307/304; B32B 2571/00; B32B 2262/10; B32B 2419/00; E01D 19/14; E01D 19/16; E01D 13/14; E01D 13/16; E01D 18/14; E01D 18/16; E02D 5/80; Y10S 428/92; Y10S 428/921; Y10T 428/13; Y10T 428/1314
USPC ...... 14/22; 428/34.1, 34.5, 920, 921; 169/48
See application file for complete search history.

(56) References Cited

U.S. PATENT DOCUMENTS

| | | |
|---|---|---|
| 4,342,179 A | 8/1982 | Hill |
| 7,943,217 B2 | 5/2011 | Baumgartner |
| 2007/0000187 A1 | 1/2007 | St. Onge et al. |
| 2010/0154147 A1 | 6/2010 | Baumgartner |

FOREIGN PATENT DOCUMENTS

| | | |
|---|---|---|
| WO | WO-2007/093703 A2 | 8/2007 |
| WO | WO-2012/052796 A1 | 4/2012 |

OTHER PUBLICATIONS

Microtherm Quilted Technical Data sheet, accessed online Mar. 8, 2019.*

(Continued)

*Primary Examiner* — Camie S Thompson
(74) *Attorney, Agent, or Firm* — Blank Rome LLP

(57) ABSTRACT

The invention concerns a cylindrical thermal protection sheath for covering a length of an elongated structural element, comprising a sandwich-like composite insulation system which has a thermal conductivity lower or equal to 0.11 W/m.° C. at 800° C. and a thickness lower than 50 millimeters.

17 Claims, 11 Drawing Sheets

(56) References Cited

OTHER PUBLICATIONS

Promat GmbH, Promat Technical Data Sheet Microtherm(R) Panel-1000R-HY, 1 pg, Published Oct. 2012, Promat GmbH.
International Search Report for CH9412015, dated Oct. 29, 2015, 2 pages.
Promat; Microtherm Panel—1000R HY, 2012; 1 page w/English-language machine translation.
Third Party Submission—EP Communication for EP Application No. 16738873.5, dated Jun. 6, 2018, 5 pages.

* cited by examiner

CYLINDRICAL THERMAL PROTECTION SHEATH

RELATED APPLICATIONS

This application claims priority to Switzerland Patent Application No. CH00941/15 filed on Jun. 30, 2015. The content of the application is hereby incorporated by reference.

FIELD OF THE INVENTION

The present invention concerns an insulation system arrangement for the thermal protection of elongated elements, and notably elongated structural elements. For instance the present invention concerns the thermal protection of cylindrical structures including cylindrical load bearing structures, tensile members and their anchorage components or tensioned cables found in external post-tensioning tendons or stay cables including their end anchorages.

Such elongated structural elements, and in particular such tensile elements, typically use high strength material, for example high strength cold-drawn steel, to allow for the transfer of concentrated forces through lightweight elements having small cross sections, notably used for the transfer of forces in bridges, buildings, special pressure containment structures, retaining walls and other structures built primarily of concrete or steel. In many cases these tensile elements are pre-tensioned in order to apply a significant pre-load, also called pre-stress, to the surrounding structure.

Said invention relates to a cylindrical sheath for the thermal protection of elongated structural elements, and notably for post-tensioning tendons, stay cables and the like. Such a sheath forms a sleeve to be fitted around a running portion of a cable, a tendon or a pipe. More generally, this sheath can serve as thermal protection for a length of any structural elongated element made from high tensile steel or other high tensile strength materials susceptible to thermal damage. Said sheath can further be adapted in shape such as to also provide protection for zones where the running portion of a cable penetrates through members of the surrounding or supported structure. Said sheath can be combined with a cylindrical cap to protect the end terminations of such cables.

More precisely the present invention concerns the protection against extreme thermal loading scenarios that result for example from hydrocarbon fires. Elongated structural elements on many different types of structures can be exposed to such fire events as a result of accidents or willfully caused, for example vehicle or ship impact or spills with the subsequent burning of fuel, burning of hydrocarbon materials used in construction or maintenance operations or other unplanned events during the lifetime of the structure involving hydrocarbon materials in a solid, liquid or gas state. Such extreme loading scenarios typically result in temperatures exceeding 600° C., and in some cases exceeding 1000° C. in confined or unconfined environments with durations which can well exceed 30 minutes, and sometimes in excess of 60 or even 90 minutes.

End anchorages of such structural elongated elements conventionally rely on mechanical anchorage by direct bearing or friction or bonding between different materials to secure highly stressed elements at their end to the surrounding structure. These end anchorages can either be directly exposed to a fire event or can experience excessive heating when a fire event occurs close to the running length of the cable and the cable acts subsequently as a heat conductor.

When subject to elevated temperatures the relaxation percentage of high tensile strength materials typically increases and their strength decreases. Cold-drawn high tensile strength steel is particularly affected by this phenomenon as the strength gain achieved by cold forming the steel during its manufacturing is largely reversed by heating above a critical temperature, consequently resulting in a loss of pre-stressing forces and a general reduction in structural resistance. Furthermore excessive heating can lead to slippage or failure of the stressed element in the end anchorage.

Subsequently, high thermal loading on such highly stressed elongated structural elements, including their end terminations, increases the likelihood of steel relaxation, tendon failure or anchorage slippage or failure occurring, resulting in an overall loss of pre-stressing force or ultimate resistance. Due to the surrounding concrete and developed bond between the high tensile steel tendons, made of strands and wires, the consequences of thermal loading in conventional post-tensioned cables internal to a concrete or other structure is reduced. External cables however, in particular post-tensioning cables external to the structure or stay cables, remain highly susceptible to thermal loading due to being exposed during an external fire event. The risk of steel relaxation, tendon failure or anchorage slippage as a direct result of an external fire event is therefore significantly higher for an external post-tensioning cable or a stay cable. Due to the concentrated manner in which such cables transfer loads and the low level of redundancy, the structural safety of civil engineering structures containing external post-tensioning tendons, cable stays or other exposed cables, such as bridges, beams, girders, cable supported towers or masts or suspended roof systems can be severely impacted by the loss of a cable in a fire event.

The running part of elongated structural members such as external post-tensioning cables and in particular stay cables is free to move under various effects such as changes in longitudinal elongation, variation of cable sag due to changes in axial cable force or changes of its deformed alignment due to changing lateral loads, such as wind drag forces, or due to vibrations caused by excitation of the cable due to wind effects or by excitation through coupling with vibrations of the structure caused by fluctuating loads or other external effects. As a result, the geometrical curve which the running part of the cable adopts can vary and relatively large movements can occur relative to the surrounding or supported structure and the cable's end anchorage. These movements can remain unrestrained or if considered detrimental to the performance of the cable (bending at the anchorage, fatigue, damage by mechanical impact between cable and surrounding structure, unacceptable reduction of comfort for the user of the structure) controlled or limited by the use of guides, stoppers or dampers fitted between the running part of the cable and the surrounding structure. It is known to dampen such relative movements by viscoelastic means or means acting by rubbing or friction. Such damping means are connected to the cable at a certain distance from the end anchorage in order to develop the required damping performance.

Given the flexible nature of such cables and the need to accommodate large movements, any thermal protection sheath provided for the running length of the cable must be able to adopt its shape to the changing sag line of the cable as well as allowing for relatively large local displacements at the interface between the thermal protection elements and the surrounding structure. Furthermore, the self weight of the sheath must remain small compared to the self weight of the cable if it is supported by the cable in order not to excessively increase the cable sag.

Given the need to fit guides, stoppers or dampers to limit the relative movements between the cable and the surrounding or supported structure, any thermal protection sheath needs to be easy to remove for the purpose of inspection, maintenance and possible replacement of such devices during the lifetime of the structure. The sheath must therefore be lightweight and modular.

Such stay cables typically support bridge decks, suspended roof structures or tall masts and towers which are all exposed to horizontal wind loads. The horizontal loads generated by wind drag on the stay cables can be a substantial part of the total horizontal loading on the structure (exceeding in some cases 50% of the total horizontal wind load). Hence it is of utmost importance to minimize the wind drag by limiting the outer diameter of the stay cables and fitting them with aerodynamically optimized surfaces. Any thermal protection sheath fitted to the cable must hence remain small in diameter.

DESCRIPTION OF RELATED ART

Many kinds of piping thermal insulation methods and systems are known. However such systems are specifically developed to reduce the exothermic flow from the covered element, whereas said invention is specifically designed to protect the covered element from an external thermal loading source, such as fire.

Furthermore, the thermal insulating properties of these conventional insulation materials do not suffice in the protection of structural elements during extreme thermal loading scenarios that typically exceed temperatures of 1000° C. for exposure durations of 30 minutes or more.

Alternatively, surface applied intumescent products form a protective coating for structural elements such that when exposed to a fire load for a small exposure interval, satisfactory element protection is provided. However, such methods and materials do not provide extended protection as they typically fail to reduce the conduction of thermal energy into the structural element during extended high temperature exposure intervals. Furthermore they are susceptible to mechanical damage as they cannot be covered by additional protective layers due to the need to allow their free expansion to achieve the protective function.

WO2007093703 relates to a fire protection device for a stay cable formed by two blankets wrapped around the cable, and overlapping each other. Also, an outer shell is covering the stacked blankets, this outer shell being made of high density polyethylene (HDPE). Such a fire protection device is not suitable for a high level thermal protection unless using an increased thickness of insulating material, which leads to an increased and undesirable weight and great difficulties in installation especially in the interface area where the cable penetrates the supported structure as well as any guides, stoppers or dampers that might have to be fitted.

WO2012052796 provides a thermally insulating rigid tube arranged around a stay cable with a thermally insulating material having a minimum thickness requiring an air channel between the insulating tube and the cable and a significant height difference to achieve heat evacuation by convection. Such an arrangement is rigid and cannot therefore accommodate the flexure which occurs along the running length of the cable under varying cable sag or the large relative displacements at the interface where the cable penetrates the supported structure during normal working conditions. Such an arrangement can only ensure the required freedom of movement of the cable by providing a very large air gap between the rigid tube and the cable resulting in a significant increase of cable diameter having an undesirable impact on the visual appearance of the cable, increasing the required lateral clearance to adjacent parts of the structure and increasing the wind drag of the cable.

BRIEF SUMMARY OF THE INVENTION

It is an aim of the present invention to provide a thermal protection sheath which mitigates or obviates at least some of the above-mentioned disadvantages.

According to the invention, this aim is achieved by means of a cylindrical thermal protection sheath for covering a length of an elongated structural element, comprising a sandwich-like composite insulation system which has a thermal conductivity lower or equal to 0.11 W/m.° C. at 800° C. and a thickness lower than 50 millimetres.

Preferably, for a thickness lower than 50 millimetres, said sandwich-like composite insulation system has a thermal conductivity at 800° C. lower than or equal to 0.10 W/m.° C. and preferably lower than or equal to 0.09 W/m.° C. Such a thermal protection sheath forms a thin multi-layered composite construction developed for the extreme extended thermal protection of length of elongated structural elements, such as external post-tensioning cables, cable stays, roof suspension elements, steel profiles and pipe ends, and in particular post-tensioning tendons and cable stay end anchorages.

The invention also relates to a thermal protection device comprising the cylindrical thermal protection sheath and a cylindrical thermal protection cap which forms an extreme extended thermal protection of end terminations of elongated structural elements.

The invention also relates to an elongated structural device comprising a tensioned cable (or any other elongated structural element) with a running part and at least one anchorage part at the end of the cable, and at least one thermal protection sheath as previously described, wherein said cylindrical thermal protection sheath covers a length of the running cable extending from the anchorage part.

Optionally, this elongated structural device further comprises an outer cover enclosing the thermal protection sheath.

Other provisions according to the invention are presented herein after in relation with some possible embodiments.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1A:
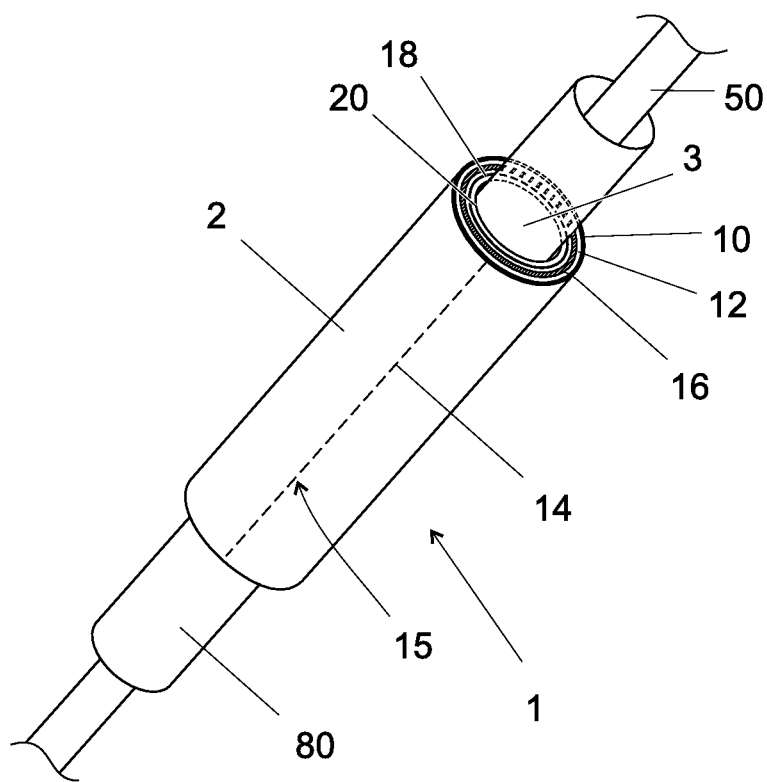
FIG. 1A shows an isometric view of an embodiment of a section of a cylindrical thermal protection sheath according to the invention.

As shown on the embodiment of FIG. 1A the thermal protection sheath 1 forms a sleeve of tubular shape, open at both ends. Therefore, the tubular thermal protection sheath 1 is formed by a wall 2 consisting of layers forming a sandwich. These layers form a composite insulation system. Preferably, the thickness and the dimensions (including the diameters when the sheath is formed) of the individual layers of thermal insulation materials are such that there is contact between the adjacent layers. In such a configuration, the layers are stacked in the sandwich like structure of the composite insulation system. A large circular opening 3 is therefore formed at both ends of the tubular thermal protection sheath 1, to allow for the introduction over the element 80 to be protected. The sheath 1 has a tubular shape with a section which can be circular or non-circular (for instance a shape such as oval, elliptic, rectangular, square, other quadrilateral or more generally other polygonal shapes).

Figure 1B:
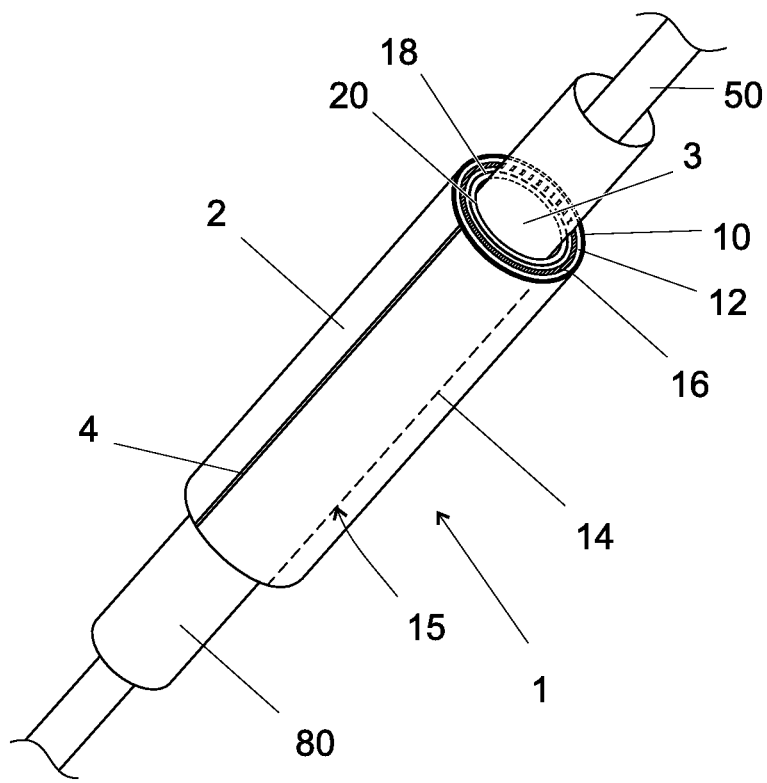
FIG. 1B shows an isometric view of an alternative embodiment of the cylindrical thermal protection sheath of FIG. 1A, FIGS. 1C and 1D respectively show an end overview and a detail of the longitudinal joint of the alternative embodiment of FIG. 1B
Figure 1C:
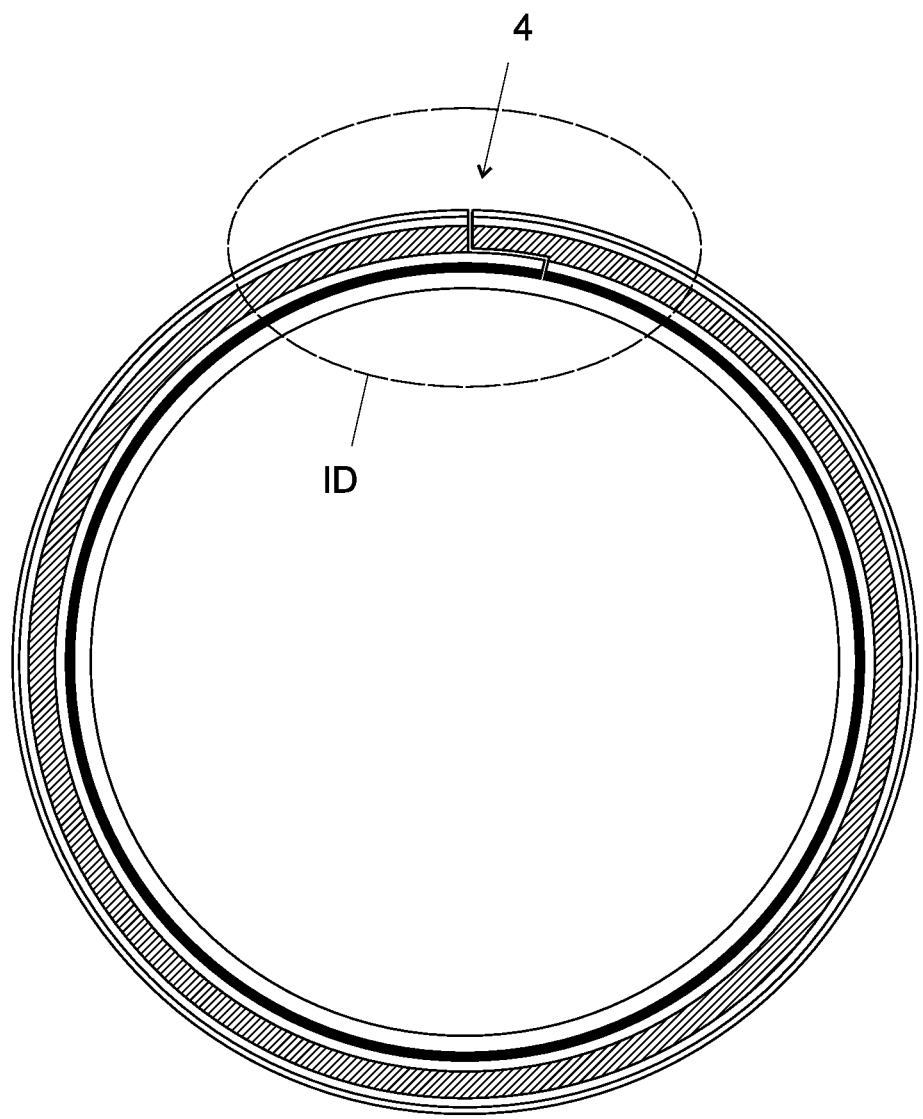
Figure 1D:
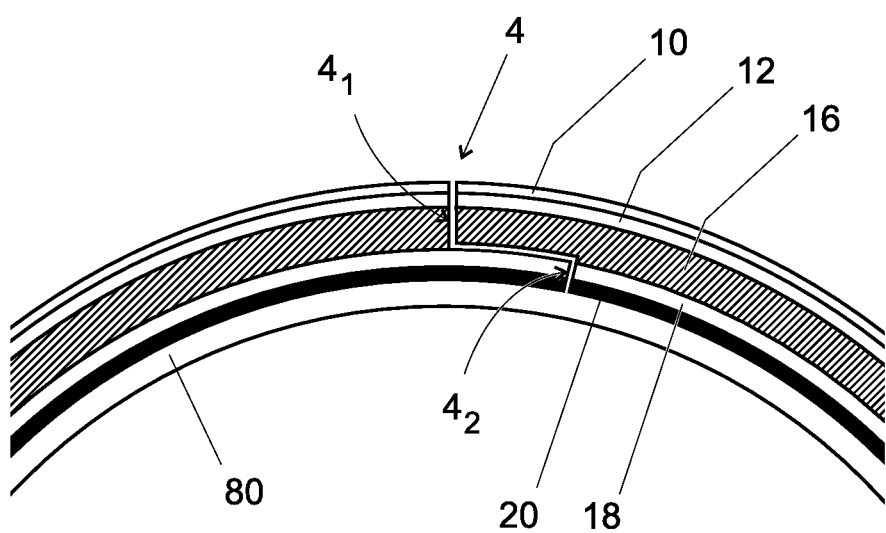

In another embodiment shown on FIG. 1B the tubular thermal protection sheath 1 is further fitted with one or several longitudinal joints 4 allowing opening of the tubular section and hence retrofitting over an already installed element to be protected. In order to not increase the overall diameter of the thermal protection system at the longitudinal joint 4, the materials forming the overlap are preferably staggered, thus resulting in a continuous material thickness around the circumference of the system. For instance as shown in FIG. 1C and FIG. 1D, along the joint 4, and for the two longitudinal edges of the sheath 1, which extends in the direction of the cable 50, outer layers 10, 12 and 16 form together a first step $4_1$ and inner layers 18 and 20 form together a second step $4_2$, offset with respect to the first step $4_1$. The direction of the offset between the first step $4_1$ and the second step $4_2$ is inversed for the longitudinal edges of the sheath 1, so that formation of the longitudinal joint 4 is obtained through abutting these two longitudinal edges of the sheath 1 which shape are therefore complementary and can fit together with contact.

In the shown embodiment the composite insulation system is composed of five layers, hereinafter mentioned as first layer 10, second layer 12, third layer 16, fourth layer 18 and fifth layer 20, from the outermost layer to the innermost layer of the composite insulation system.

The first layer 10 is a protective layer formed of metallic, metallic-like or non-metallic material being made preferably of a reflecting material such as aluminized reflective fabric. More generally, this first layer 10 has preferably a metallic-like outer face reflecting thermal energy. This first outer layer 10 provides the external layering of said composite insulation system and of said cylindrical thermal protection sheath 1: it forms an outer cover. Preferably, this is a protective outer cover providing protection to the rest of the sheath 1, notably against mechanical damages (such as etching or wear) and/or atmospheric exposure (such as ultraviolet rays protection). To have the shape of a sleeve with two open ends, as for other layers, the first (outer) layer 10 is for instance formed by a rectangular piece attached together by stitching 14 to form a cover that encompasses the entirety of said sheath external area.

This first layer 10, such as an aluminized reflective fabric, serves in an embodiment to reflect thermal radiation, thus reducing thermal energy input into subsequent internal layers of the composite insulation system. This first layer 10 also serves as thermal insulation. Being the exposed layer of the thermal protection sheath 1, the first layer 10 is preferably durable, water resistant and has a high tear resistance.

Being susceptible to the environment and exposed to handling during installation, it is preferable that the yarn stitching 14 is of a double stitched weave to provide system robustness. Also as a preferred composition of the yarn material of the stitching 14, one can choose stainless steel or other high temperature material such as glass fibre or Kevlar based fibre, or similar high-strength, high temperature materials, or any mixture thereof.

In some cases, the first layer 10 can be omitted: this can particularly occur when another outer element covers, and therefore protects, the composite insulation system. For instance an external protection can be provided by other means, i.e. for instance an outer pipe (not illustrated in FIGS. 1A and 1B) wrapping the thermal protection sheath 1, which outer pipe can be a HDPE pipe or a steel pipe.

The second layer 12 forms the layer below the first layer 10 (or this second layer 12 constitutes a first outer layer when there is no layer 10). The second layer 12 is covering the inner side surface of the first layer 10. This second layer 12 is placed directly against the inner side of the first layer 10. Preferably, the second layer 12 is bi-axially inter-stitched to the first layer 10 with stitching 14. Thereby, the first and second layers 10 and 12 form together an outer assembly of the composite insulation system and of the tubular protection sheath 1. More precisely, the first layer 10 is formed by the above-mentioned rectangular piece with two ends which overlap at the circumference interface and are stitched. Therefore the first layer 10 is individually stitched with stitching 14. Also, the second layer 12 has a layout analogous to that of the first layer 10, the circumferential position of the overlapping ends of the rectangular piece for the second layer 12 being staggered with respect to the circumferential position of the overlapping ends of the rectangular piece of the first layer 10. The first layer 10 and the second layer 12 are set such that the stitched connections are staggered providing continuous cover outside or inside the respective stitching. The stitching 14 previously mentioned is made with a thermal resistant thread 15.

According to the invention, the second layer 12 is a fabric consisting of filaments and yarns. These yarns can be reinforced yarns: they serve to reinforce the filaments of the fabric. Therefore, the second layer 12 is essentially a primary continuous filament fabric.

Preferably, the fabric is a high strength insulation fabric. Also, preferably, the fabric is a high temperature resistant fabric. Consequently, the second layer 12 brings cohesion within the composite insulation system.

Preferably, said filaments primarily consist of fabric, preferably mineral fabric, for instance a vermiculite fabric. This second layer 12 serves as a high temperature reinforced fabric for added thermal protection and added overall strength to the thermal protection sheath 1. The second layer 12 contributes to the structural integrity of the composite insulation system.

Facing the inner side of said second layer 12 is placed the third layer 16 made of or mainly formed by a thermal insulation layer which is essentially made from fibers. These fibers are preferably formed by mineral materials. Preferably, said fibers of said third layer 16 are made from any of the following materials: ceramic, glass or other mineral material. Said thermal insulation layer is therefore preferably ceramic wool, a glass wool or any similar material. This third layer 16 preferably forms a thermal wool insulation layer, with fibers which may be of a mineral or glass composition with a total bulk density relative to the level of thermal protection required. The third layer 16 is covering all the inner side surface of the second layer 12. This third layer 16 is placed directly against the inner side of the second layer 12.

In an embodiment, the third layer is formed by a fibrous ceramic wool that enhances thermal insulation properties with a low thermal conductivity.

In a preferred embodiment, said third layer 16 has a thermal conductivity at 200° C. equal to or lower than 0.08 W/m.° CK, and preferably equal to or lower than 0.06 W/m.° C. at 200° C. In a preferred embodiment, said third layer 16 has a thermal conductivity at 200° C. comprised between 0.04 and 0.07 W/m° C. Said third layer 16 has preferably a thermal conductivity at 400° C. equal to or lower than 0.15 W/m.° CK at 400° C., and preferably equal to or lower than 0.1 W/m.° C. In a preferred embodiment, said third layer 16 has a thermal conductivity at 400° C. comprised between 0.05 and 0.15 W/m° C. Said third layer 16 has preferably a thermal conductivity at 800° C. equal to or lower than 0.3 W/m, and preferably equal to or lower than 0.2 W/m.° C. In a preferred embodiment, said third layer 16 has a thermal conductivity at 800° C. comprised between 0.15 and 0.3 W/m° C. Said third layer 16 has preferably a thermal conductivity at 1000° C. equal to or lower than 0.5 W/m. ° C., and preferably equal to or lower than 0.3 W/m.° C. In a preferred embodiment, said third layer 16 has a thermal conductivity at 1000° C. comprised between 0.2 and 0.5 W/m° C.

In an embodiment, said third layer 16 comprises an envelope defining separate compartments filled with said fibers. For instance, said compartments are cross-stitched pockets. This pillowing of the third layer 16 contributes to durability, and allows the insulation of this third layer to remain more rigid as to prevent folding or wrinkling during handling and installation of the thermal protection sheath 1.

Preferably, the composite insulation system comprises a fourth layer 18 covering the inner side of the third layer 16, with a micro-porous thermal insulation material. This micro-porous thermal insulation material, such as micro-porous calcium-silicate material, forms a high temperature thermal insulation barrier.

Said fourth layer 18 has preferably a thermal conductivity at 400° C. equal to or lower than 0.035 W/m.° C., and preferably equal to or lower than 0.03 W/m.° C. In a preferred embodiment, said fourth layer 18 has a thermal conductivity at 400° C. comprised between 0.025 and 0.035 W/m.° C. Said fourth layer 18 has preferably a thermal conductivity at 600° C. equal to or lower than 0.05 W/m.° C., and preferably equal to or lower than 0.04 W/m.° C. In a preferred embodiment, said fourth layer 18 has a thermal conductivity at 600° C. comprised between 0.035 and 0.05 W/m° C. Said fourth layer 18 has preferably a thermal conductivity at 800° C. lower than or equal to 0.1 W/m.° C., and preferably equal to or lower than 0.07 W/m.° C. In a preferred embodiment, said fourth layer 18 has a thermal conductivity at 800° C. comprised between 0.04 and 0.1 W/m° C.

This fourth layer 18 is placed directly against the inner side of the third layer 16. The fourth layer 18 is covering all the inner side surface of the third layer 16.

In an embodiment, said fourth layer 18 comprises an envelope defining separate compartments filled with said micro-porous thermal insulation material. For instance, said compartments are cross-stitched pockets of a predefined size based on the dimensional requirements of the thermal protection sheath 1.

In an embodiment, said micro-porous thermal insulation material comprises a silica and/or calcium silicate and/or alumina silicate. Preferably, said micro-porous thermal insulation material comprises pyrogenic silica.

In an embodiment, said micro-porous thermal insulation material comprises particles. Such particles are preferably made of or essentially made of silica and/or calcium silicate and/or alumina.

In an embodiment, said composite insulation system is hydrophobic. In an embodiment, said fourth layer 18 is hydrophobic.

The third layer 16 forms a malleable panel at the interspace between the fourth layer 18 and the second layer 12.

Preferably, said third layer 16 and said fourth layer 18 are attached to each other, for instance by interlayer stitching 14. Depending on the total size of said thermal protection sheath 1, it may be necessary to use multiple panels for both the third layer 16 and fourth layer 18, whereby overlapping of the edges of these panels is required at several locations on the circumference interface of each respective layer 16 and 18. Staggering of over-lap along the circumference achieves an increased thermal protection efficiency. The manner in which the overlap is achieved should be such that no excess material remains such that a tight fitting superposed layering as in FIG. 1 results.

A staggered construction technique is implemented for cross-connection of the fabric layers to envelope the circumference interface as well as being staggered between subsequent layers. Such a method is preferred to eliminate the likelihood of a thermal passage forming between stacked layers 10, 12, 16, 18 and at the interface of each pair of adjacent layers among the stacked layers 10, 12, 16, 18.

As shown in FIG. 1, in an embodiment, a fifth layer 20 is used as an inner layer in the composite insulation system. Such a fifth layer 20 is placed against the inner side of the fourth layer 18. Such a fifth layer 20 is a durable layer. Preferably, said fifth layer 20 comprises a glass fabric. Such fifth layer 20 provides necessary protection of said fourth layer 18 as manufacturing, handling and installation of the sheath can result in structural layer damage.

In an embodiment the fifth layer 20 forms the interface layer between fabric layers forming said composite insulation system and a pipe 80. Preferably, said pipe 80 is made of a thermoplastic material, for example a polyethylene. In an embodiment, said pipe 80 provides the outer enclosure of a high tensile steel cable 50 for example a stay cable, for which it provides the necessary installation space and mechanical protection. The cable 50 can be either a solid element or made up of a group of parallel or stranded wires or groups of strands made of wires helically wound around a core wire. In that case, said pipe 80 is placed between said running part of the cable 50 and the thermal protection sheath 1 as shown in FIGS. 1A and 1B. In another embodiment said pipe 80 is an integral part of the stay cable, for example by being extruded onto the pre-fabricated stay cable during its fabrication or with a space between said pipe 80 and the cable 50, such space being filled with an injection material, for example grease, wax or cement grout. In another embodiment where it is not necessary to provide an installation space said pipe 80 can be omitted and the fifth layer 20 is directly adjacent to the cable 50.

In an embodiment, the composite insulation system of the thermal protection sheath 1 comprises at least four thermal insulating layers with at least one layer forming an outer layer and comprising a reflective fabric, one layer comprising a high strength thermal fabric, one layer comprising a fibrous wool based thermal insulation layer and one layer comprising powder filled flexible pocket panels.

In another embodiment, the composite insulation system of the thermal protection sheath 1 comprises at least three thermal insulating layers with at least one layer comprising a high strength thermal fabric, one layer comprising a fibrous wool based thermal insulation layer and one layer comprising powder filled flexible pocket panels.

Such a thermal protection sheath 1 has been tested according to the ISO 834 (1975) "Fire Resistance Tests-Elements of Building Construction". The ISO 834:1975 standard establishes the resistance of building components subjected to standard thermal loading conditions. A thermal protection device according to the present invention has been tested after subsequently being installed over the anchor end of a stressing cable located in a concrete substrate. These tests have been conducted with success according to the temperature curve shown in ISO 834:1975 standard, which reaches an environment temperature of 1050° C., after 120 minutes. Also, other more drastic tests have been conducted with success with the thermal protection device including a sheath and a cap, in accordance with the hydrocarbon curve referenced in the European Standard EN 1991-1-2, section 3.2.3, namely with a temperature reaching 1100° C. after 30 minutes.

The cylindrical thermal protection sheath 1, and more generally the composite insulation system, also serves for protection against other thermal source such as environmental impacts: direct sunlight exposure, any change in ambient temperature from other sources than fire.

FIGS. 2 to 6, describe a thermal protection sheath 60 forming a sleeve for the protection of a portion of an elongated structural element forming a tensioned cable 50, for example a stay cable.

In this instance the sandwich-like composite thermal insulation system made from the fire protection layers previously described (optionally the first layer 10, the second layer 12, the third layer 14, the fourth layer 16 and optionally the fifth layer 18) protects in a preferred embodiment critical elements of a stay cable in the area where they might become exposed to a fire event. Using a thermal protection sheath 60 formed with said sandwich-like composite thermal insulation system, one can obtain a suitable thermal protection of parts of a tensioned cable 50, including guide pipe 55, guide system 70, deviator or damper 72, and other components being part of an anchorage 52 (see FIG. 4 to FIG. 6).

In FIGS. 2 to 5, a thermal protection cap 5 is visible at the left side while it covers an anchorage 52 fixed to a load transfer abutment of the civil engineering structure, for example a blister or panel 51 of the bridge deck 100, and a thermal protection sheath 60 extends the thermal protection of the tensioned cable 50 from the other side of the load transfer member.

To that end, the thermal protection sheath 60 and the thermal protection cap 5 are formed by a sandwich-like composite thermal insulation system. Namely, the thermal protection sheath 60 contains possibly the first layer 10, second layer 12, third layer 14 and fourth layer 16, as previously described, and which are superposed, and the thermal protection sheath 60 wraps a length of the running portion of the tensioned cable 50 extending from the anchorage 52.

Figure 2:
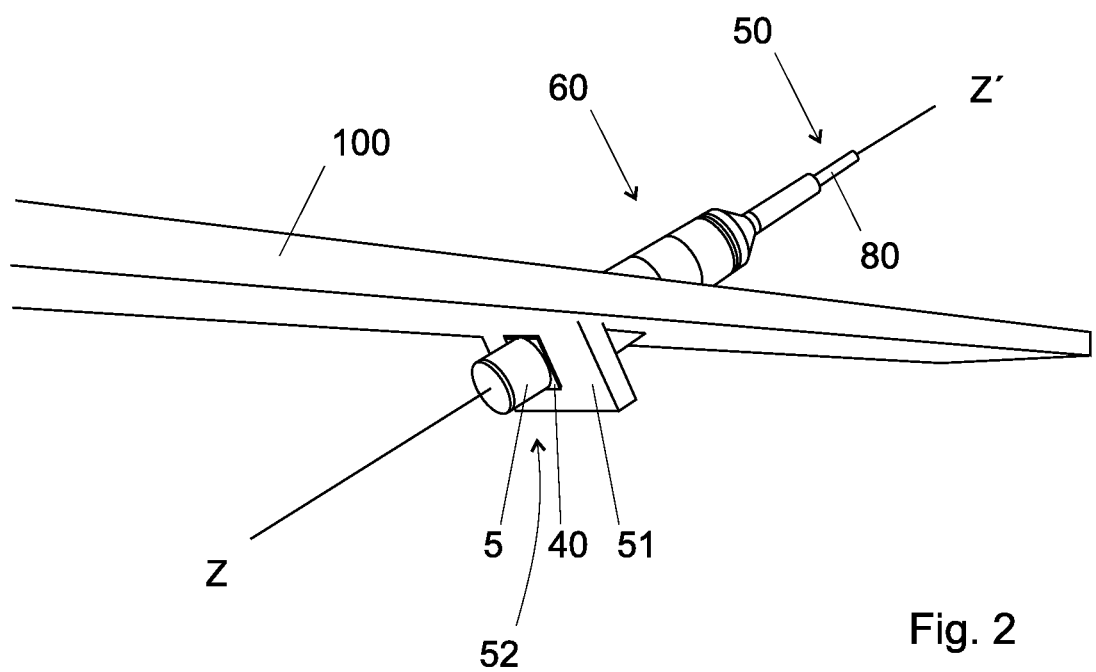
FIG. 2 is a perspective view of a thermal protection device, with a thermal protection sheath according to the invention, mounted on a stay cable system of a civil engineering structure.
Figure 3:
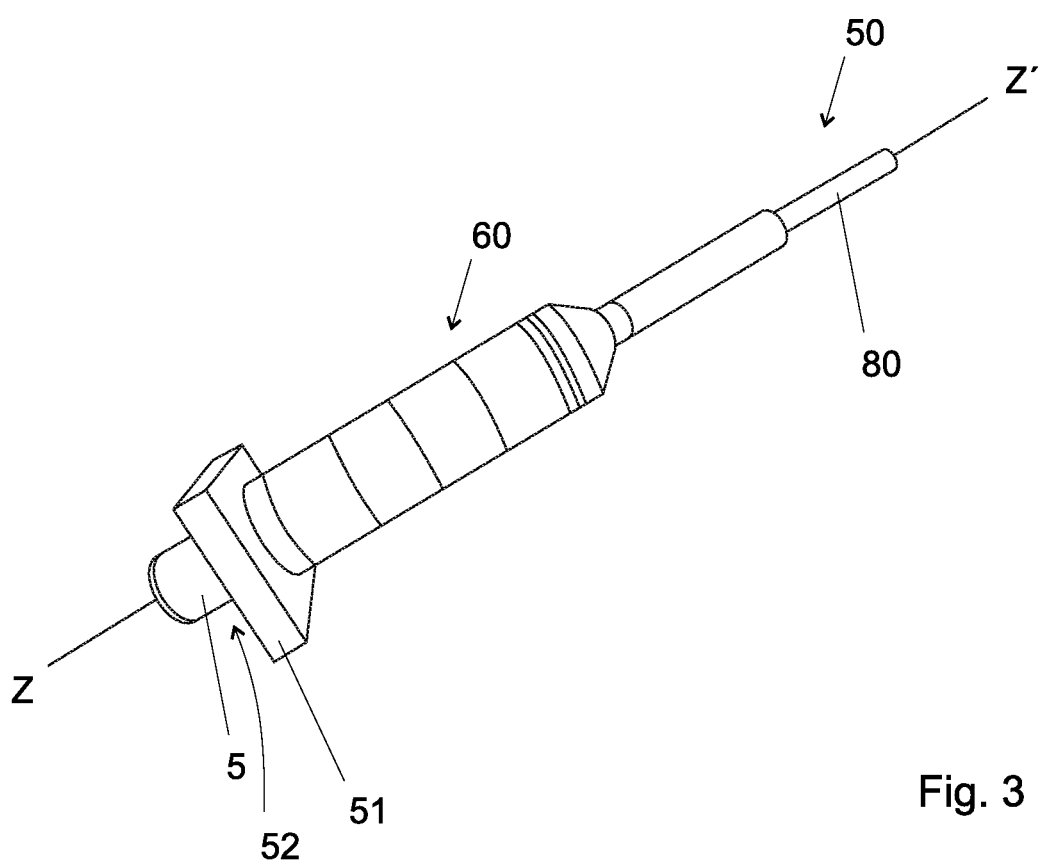
FIG. 3 is a perspective view of the stay cable system of FIG. 2 with a thermal protection device including a thermal protection cap mounted on the anchorage and a thermal protection sheath according to the invention mounted on the length of the running portion extending from the anchorage and also covering the interface area between the civil engineering structure and the cable.

In FIG. 2, the tensioned cable 50 is mounted on a bridge deck 100, through a blister or panel 51 forming a portion of the concrete substrate. The anchorage 52 (tensioned cable end) and the thermal protection cap 5 extends under the bridge deck 100. The running part of the tensioned cable 50 and the sheath 60 extend above the bridge deck 100. The cable anchorage 52 might alternatively also be located above the bridge deck 100 and connected to it by means of a steel or concrete element such as the panel 51 and protruding upwards from the bridge deck 100: in that situation, end portion of the cable 50, thermal protection sheath 60 and cap 5 are upwardly offset with respect to their position in FIG. 2.

Figure 4:
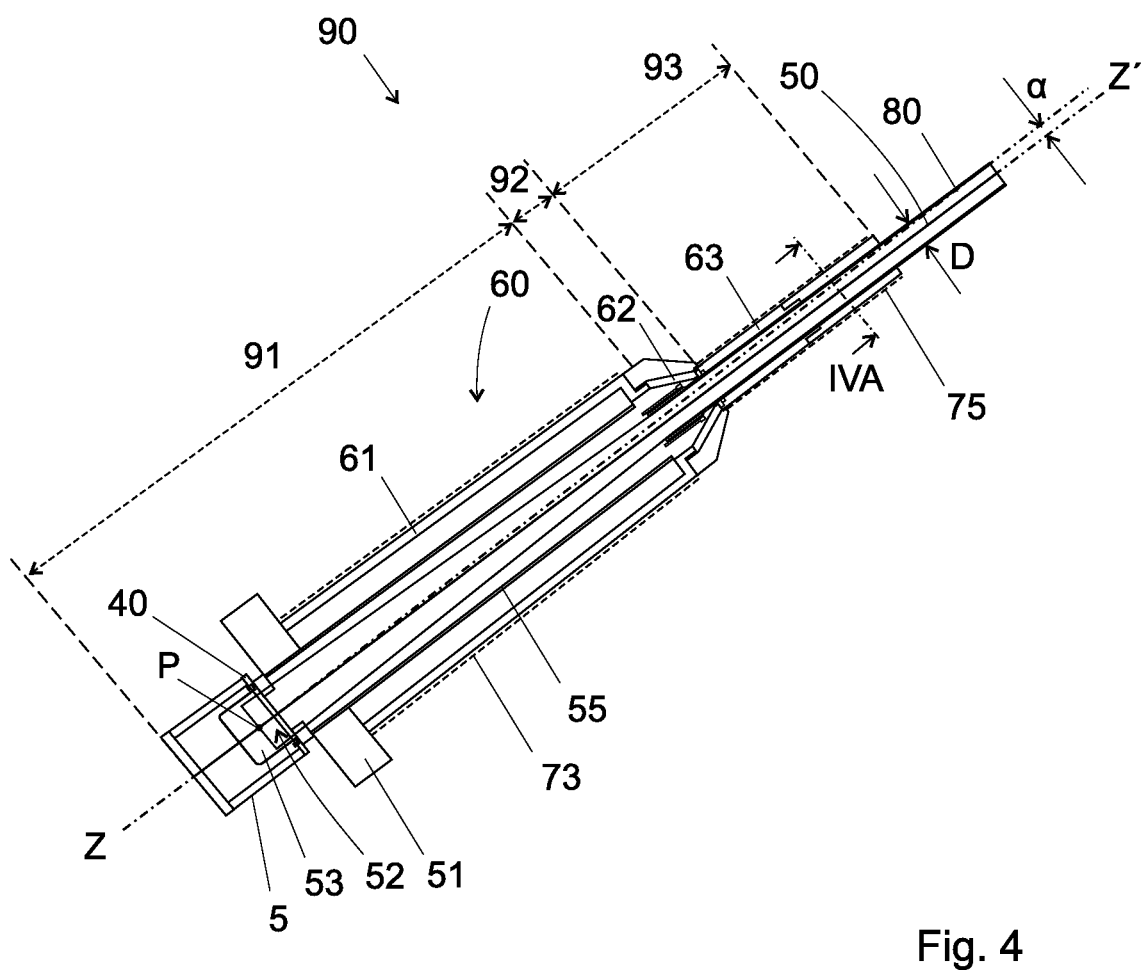
FIG. 4 is a longitudinal section of the stay cable system with the thermal protection device of FIG. 3.
Figure 4A:
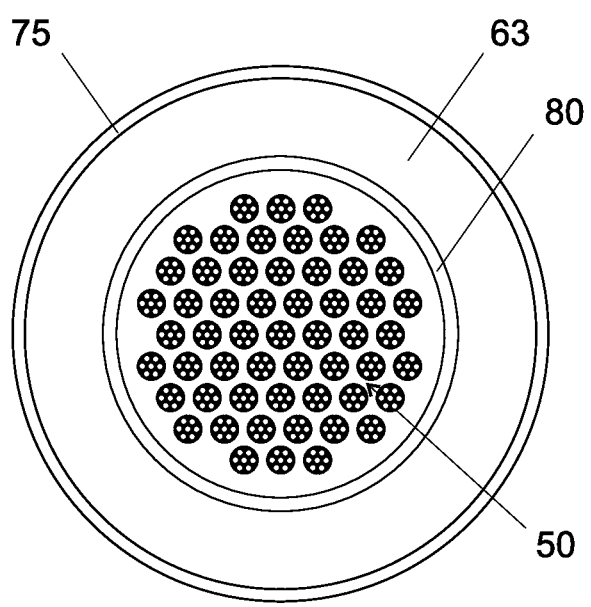
FIG. 4A shows the section of the adjacent elements of the third portion of the thermal protection sheath according direction IVA-IVA of FIG. 4.

In the illustrated and preferred embodiment shown in FIG. 4, the thermal protection sheath 60 comprises three portions 61, 62, 63. More precisely, said sheath 60 has three portions comprising a first cylindrical portion 61 with a first diameter for covering the length of an elongated structural element close to an anchorage 52, a second portion 62 shaped as a frustum of a cone and extending from the first cylindrical portion 61 with a reducing diameter, and a third cylindrical portion 63 with a third diameter which is smaller than the first diameter. In some cases, any of the three portions 61, 62, and 63 is omitted if the respective area is not exposed to a fire event.

The first portion 61 forms an envelope surrounding the length of the tensioned cable 50 extending from the anchorage 52 and housed inside a guide pipe 55 forming a void inside the structure 51. In an embodiment the guide pipe is fitted with a flange 55a (see FIG. 5) to support the weight of portions 62 and 63 and other possible elements of the cable assembly such as guides (such as guide system 70 of FIG. 5) and dampers (such as damper 72 of FIG. 5). The guide pipe 55 is sized such as to allow transverse movement of the cable 50 and the first portion 61 is dimensioned so as to fit over the flange 55a. To that end, there is a cylindrical space 61a between the inner face of the first portion 61 and the outer face of the guide pipe 55. The first portion 61 has preferably a constant internal diameter. At the end of the first portion 61 close to the anchorage 52, the first portion 61 is firmly resting on the concrete panel 51 (slab or abutment). At the end of the first portion 61 opposite to the anchorage 52, the first portion 61 forms an inward flange 66 for connection with the second portion 62. An optional rigid cylindrical outer cover 73, for example made of steel, and possibly formed by two assembled half-shells, may provide additional protection and durability for the first portion 61 (see FIG. 4).

In a preferred embodiment, the composite insulation system forming the first portion 61 comprises four layers which are the second layer 12, the third layer 16, the fourth layer 18 and the fifth layer 20 as previously described. In that case, preferably, the first portion 61 is preferably covered by said outer cover 73.

The second portion 62 is an envelope surrounding a section of the cable 50 installed with the guide or damping means: the second portion 62 is dimensioned such that it does not impede the guide system 70. This is achieved by providing an annular space 62a between the inner face of the second portion 62 and the outer face of the guide system 70. The second portion has a variable internal diameter increasing from the internal diameter of the first portion 61 (first diameter) to the internal diameter of the third portion 63 (third diameter). The guide system 70 can have several possible configurations and functions, such as only bundling the cable 50 and being attached to the cable 50, but free to move relative to the guide pipe 55 (see FIG. 6), or guiding the cable 50 by being fixed relative to the cable 50 and the guide pipe 55 (not shown) or being part of a rigid or semi-rigid guide or a damper 72 fixed between the cable and the guide pipe 55 (see FIG. 5). Also an outer rigid shell 64 taking the shape of a frustum of a cone covers the second portion 62 to provide durability and protection of the second portion 62.

In a preferred embodiment, the composite insulation system forming the second portion 62 comprises five layers which are the first layer 10, the second layer 12, the third layer 16, the fourth layer 18 and the fifth layer 20 as previously described.

In another preferred embodiment, the composite insulation system forming the second portion 62 comprises four layers which are the second layer 12, the third layer 16, the fourth layer 18 and the fifth layer 20 as previously described.

Figure 6:
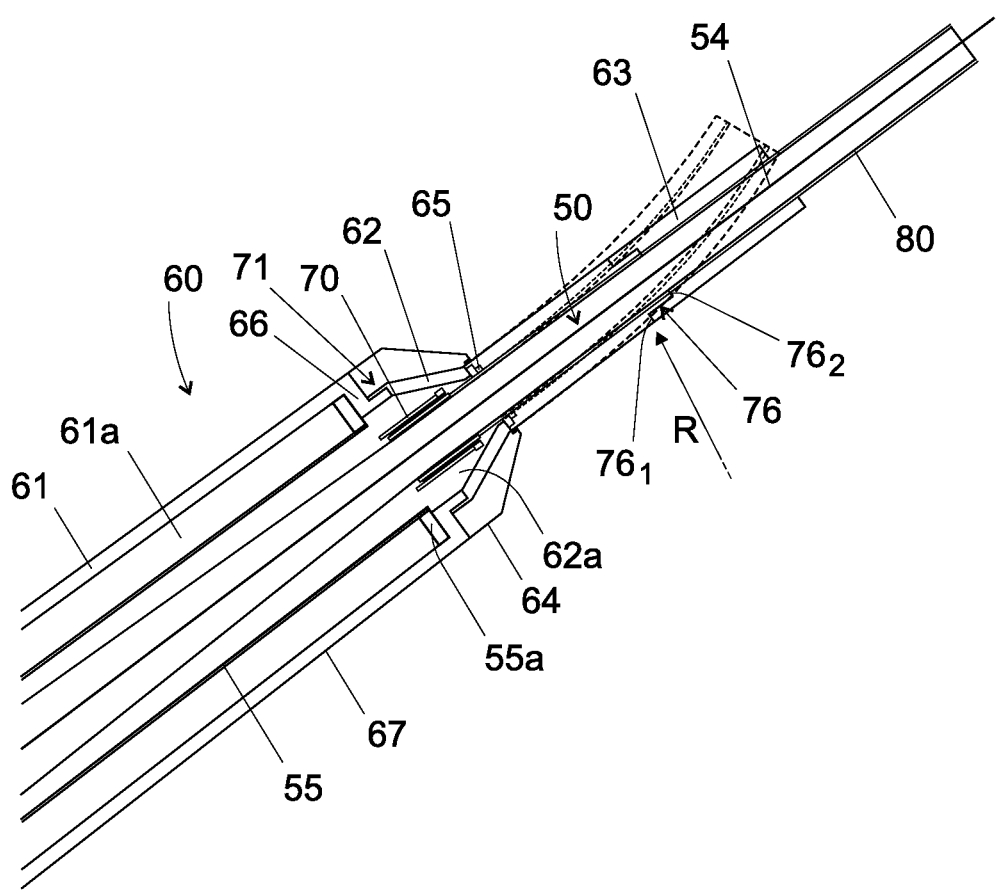
Figure 7:
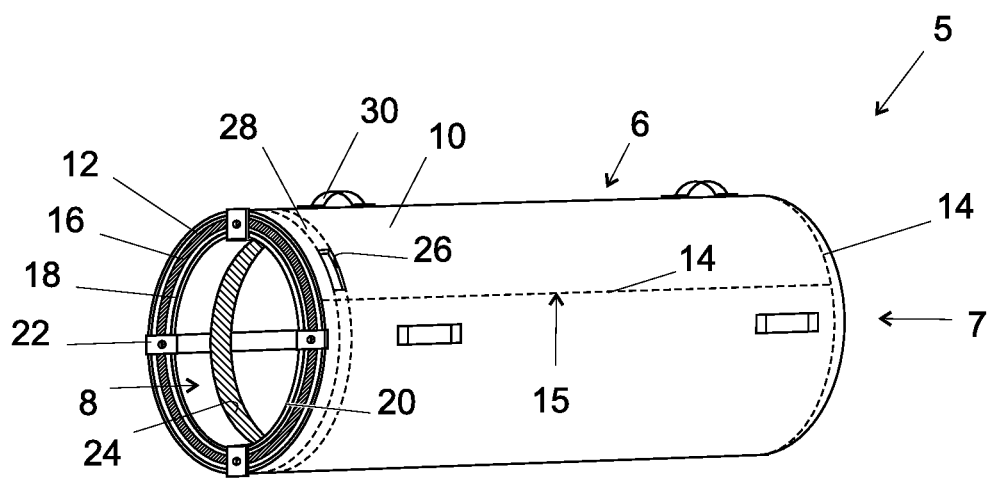
FIG. 7 shows an isometric view of an embodiment of a cylindrical thermal protection cap.

The third portion 63 encloses the length of the running portion of the cable 50 by being placed around the outer pipe 80 of the cable 50 in a close or tight manner with or without a nominal gap. The diameter of the third portion wrap is hence such that the inner diameter is the same or slightly larger than the outer diameter of the outer face of the cable 50. There is a possible relative movement longitudinal to the cable 50 between the third portion 63 and the pipe 80 allowing sliding during installation or maintenance operations and during longitudinal deformation of the cable 50 under varying axial cable loads. As shown in FIG. 6 the third portion 63 can be formed by multiple successive parts attached together. Actually, this third portion 63 can have a small or large length, ranging preferably up to 50 meters, and more preferably up to 20 meters and ranging preferably up to 10 meters, notably about from 1 to 10 meters. Important lengths are therefore achieved by subsequent connection of multiple portion units.

In another preferred embodiment, the composite insulation system forming the third portion 63 comprises four layers which are the second layer 12, the third layer 16, the fourth layer 18 and the fifth layer 20 as previously described. In that case, preferably, the third portion 63 is preferably covered by an outer cover 75 (HDPE or steel) possibly formed by a pipe which may provide additional protection and durability for the third portion 63 (see FIG. 4). This optional rigid cylindrical outer cover 75 can also be used in presence of the first layer 10 in the composite insulation system forming the third portion 63.

Figure 5:
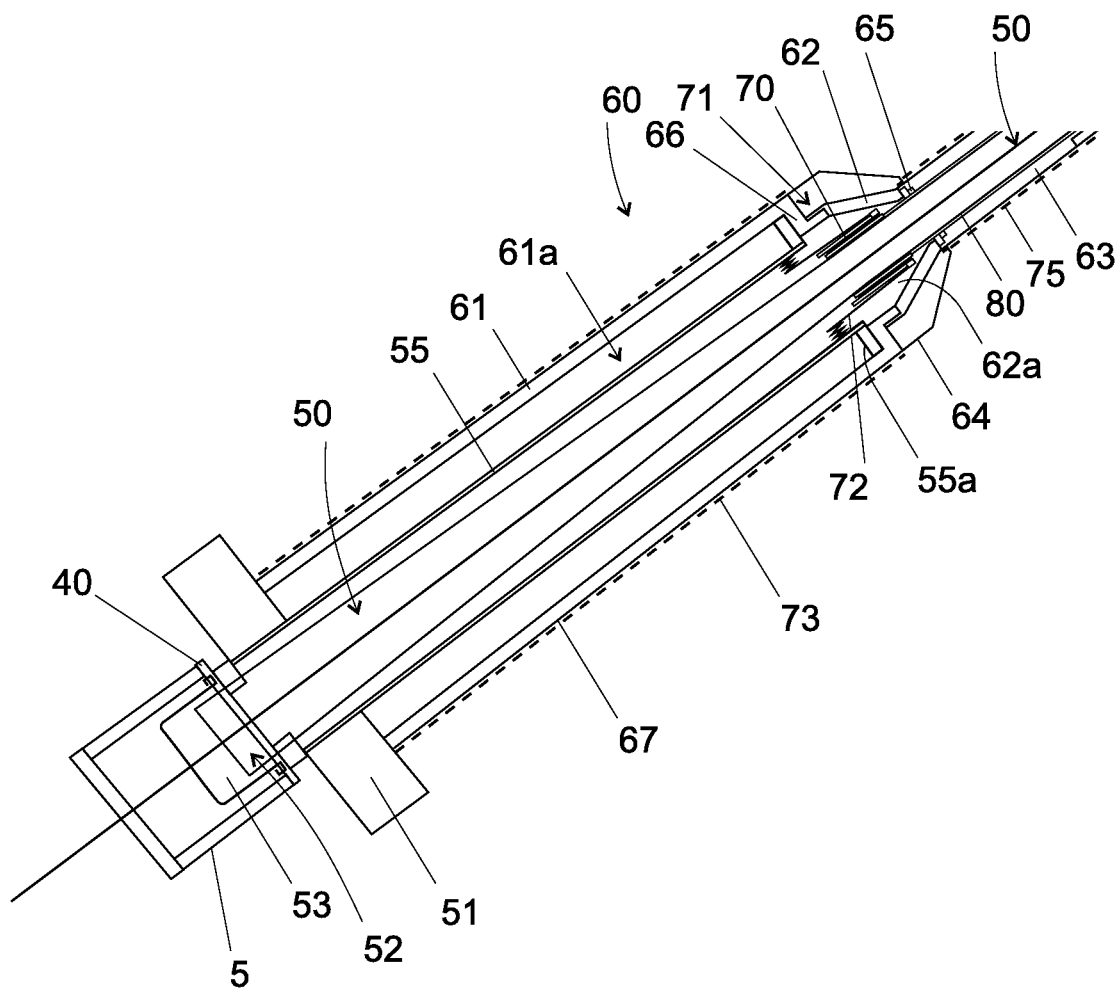
FIGS. 5 and 6 are enlarged partial views of FIG. 4.

The connection between the first portion 61 and the second portion 62 is achieved through an overlapping splice joint 71 (see FIG. 5). More precisely, the composite insulation system of the first portion 61 and of the second portion 62 both have end portions which are superposed at the interface. To accommodate relative movements between the cable 50 and the guide pipe 55 and therefore also between the first portion 61 and the third portion 63, the second portion 62 is fabricated in a manner to allow for flexibility. This is achieved in a preferred embodiment by providing enough geometrical slack in the shape of the second portion 62.

A similar spliced arrangement is used for the connection between the second portion 62 and the third portion 63. Preferably, as can be seen in FIGS. 5 and 6, an insulation support board 65 is placed at the junction of the second portion 62 and of the third portion 63: it supports the outer cover 64 and reduces the passage of heat from this cover 64 to the cable 50. Preferable the support board 65 rests on a spacer tube which in turn rests either on the guide 70 or the guide pipe flange 55a.

Preferably, the total length of the first portion 61 and second portion 62 is equal to or lower to 75% of the total length of the sheath 60.

In a further embodiment at least one portion of the sheath 60, among the first portion 61, the second portion 62 and the third portion 63, is formed by two half shells assembled together in a reversible manner. Preferably, both second portion 62 and third portion 63 are formed by two half shells. Such a configuration in two parts allows for easy installation on pre-existing mounted tensioned cable 50 and also facilitates the possibility of control and maintenance of the equipment of the tensioned cable 50 wrapped within the composite insulation system.

Such a configuration, and notably the flexibility of the sandwich-like composite insulation system and materials, allows a possible flexural deformation of the thermal protection sheath 60, and in particular its third portion 63 to follow the variation of sag of the cable 50 due to changes in axial cable force or changes of its deformed alignment due to changing lateral loads, such as wind drag forces, or due to vibrations caused by excitation of the cable due to wind effects or by excitation through coupling with vibrations of the structure caused by fluctuating loads or other external effects. Additional flexural deformation of the sheath 60 can be achieved by providing flexible joints between individual elements of the third portion 63. This is a similar joint as the spliced arrangement 71 between first and second portions 61, 62 and achieved in a similar manner as described for the longitudinal joint 4 with a staggered overlap resulting in a continuous material thickness along the length of the system. For instance as shown in FIG. 6, along the joint 76, outer layers 10, 12 and 16 form together a first step $76_1$ and inner layers 18 and 20 form together a second step $76_2$, which is axially offset with respect to the first step $76_1$. The direction of the offset between the first step $76_1$ and the second step $76_2$ is inversed for the transverse edges of the sheath 1, so that formation of the axial joint 76 is obtained through abutting these two extremities of the adjacent pair of individual elements of the third portion 63 of the sheath 60. The shape of these end edges being therefore complementary and able to fit together with contact which provides continuous thickness of the wall for the whole third portion 63. Also, it provides a splice connection for adjacent elements of the third portion 63, therefore preventing thermal passage at the interface of two adjacent elements of the third portion 63.

Also, by means of allowing the third portion 63 of the sheath 60 to move relative to the cable 50 in the longitudinal direction by means of sliding at the interface the cable 50 remains free to deform longitudinally under varying axial cable loads. Such load variation can be caused for example by changes in bridge traffic loading, temperature and other external loads.

It has been calculated and tested that the composite insulation system according to the invention allows a thermal conductivity lower than or equal to 0.11 W/m.° C. at 800° C. for a thickness lower than 50 millimeters, and notably a thickness between 20 and 40 millimeters.

A thermal conductivity at 800° C. equal to or less than 0.10 W/m.° C., or even equal to or less than 0.09 W/m.° C. can be obtained for the composite insulation system according to the invention. In a preferred arrangement, a thermal conductivity at 800° C. ranging from 0.06 W/m.° C. to 0.11 W/m.° C. can be obtained for the composite insulation system according to the invention.

Also, these tests and calculations showed that with such a thin composite insulation system according to the invention, the thermal conductivity performance at other working temperatures reaches also very good results.

Notably, at 200° C., the composite insulation system according to the invention allows a thermal conductivity lower than or equal to 0.01 W/m.° C., lower than or equal to 0.009 W/m.° C. and even lower than or equal to 0.0085 W/m.° C., preferably ranging from 0.006 W/m.° C. to 0.01 W/m.° C.

At 400° C., the composite insulation system according to the invention allows a thermal conductivity lower than or equal to 0.022 W/m.° C., lower than or equal to 0.02 W/m.° C. and even lower than or equal to 0.018 W/m.° C., preferably ranging from 0.011 W/m.° C. to 0.022 W/m.° C.

At 600° C., the composite insulation system according to the invention allows a thermal conductivity lower than or equal to 0.084 W/m.° C., lower than or equal to 0.08 W/m.° C. and even lower than or equal to 0.075 W/m.° C., preferably ranging from 0.045 W/m.° C. to 0.084 W/m.° C.

For a higher temperature of 1100° C., the composite insulation system according to the invention allows a thermal conductivity lower than or equal to 0.17 W/m.° C., and even lower than or equal to 0.15 W/m.° C., preferably ranging from 0.10 W/m.° C. to 0.17 W/m.° C.

Also, by means of the previously described sandwich-like composite insulation system and the materials used, the sheath 1 or 60 has a maximum weight $W_{max}$ per length unit given by:

$$W_{max} = K \times D \ [kG]/[m2]$$

with D the smallest inner diameter of said sheath 60 (in m), $W_{max}$ in kg/m and Factor K between 20 to 30, preferably between 22 to 27, and which can be 25. When the sheath 60 is formed in three portions 61, 62 and 63 as described above and the third portion 63 has the third diameter which is the smallest diameter, D corresponds also sensibly to the outer diameter of the cable 50 (see FIG. 6).

For the sheath 60, this value for the maximum weight $W_{max}$ per length unit concerns the third portion 63 which therefore has a small weight (about 1 Kg/m to 10 Kg per m) which remains small compared to the self weight of the cable 50 which advantageously not excessively increases the cable sag and hence tension in the cable 50 (if it is supported by the cable).

Any variation of the deformed alignment or sag of the cable 50 will result in rotations at the reference point P between the running length of the cable and elements rigidly connected to the supported or surrounding civil engineering structure such as the guide pipe 55 or the end of the anchorage 52. The reference point P corresponds for example to the fixation point of the strand of the cable 50, which is considered to be located at the terminal end face of the anchorage 52 on the left of FIG. 4). Such angular rotations (angle α in FIG. 4) can exceed for example 10 mrad, or for example 25 mrad and can reach up to 50 mrad depending on the length of the cable and the flexibility of the civil engineering structure. Any angular rotation α translates in a relative displacement transverse to the longitudinal direction of the cable between the running length of the cable 50 and the supported or surrounding civil engineering structure in discrete points such as for example at the exit of the guide pipe 55 adjacent to the second portion 62 of the sheath 60 requiring to accommodate large transverse movements by providing for example geometrical slack in the shape of the second portion 62.

With that configuration, the sheath 60 can accommodate typical flexure of the running part of the cable 50 as well as transverse movements resulting from typical angular rotations α close to the anchorage 52 between the movable parts attached to the cable 50 and the fixed parts attached to the supported or surrounding civil engineering structure. Also, such flexibility is also advantageous for the cable installation, because it allows movements sufficiently large of the cable 50 equipped with the sheath 60 to have an easy handling.

Preferably, this flexibility is such that said sheath 60 (or sheath 1) can be bent so as to define an arc of circle having a radius R of about 2 m or more Notably, said sheath 60 flexibility is such that the third portion 63 can be bent so as to define an arc of circle having a radius R of about 2 m or more (see FIG. 6).

Also, said sheath 60 flexibility is such that when the end of the second portion 62 close to the anchorage 52 is fixed, said sheath portion 62 can accommodate a displacement transverse to the longitudinal direction of the cable 50 equivalent to an angular rotation α of the running part of the cable at the exit of the anchorage of at least 50 mrad, following thereby the movement of the cable 50 (see FIG. 4).

Preferably, said sheath 60 (or sheath 1) can accommodate a transverse movement being equal to D, where D is the internal diameter of the sheath 60 (or of sheath 1), or D is the smallest internal diameter of the sheath.

As shown in FIG. 4, the sheath 60 forms a thermal protection device 90 which, in terms of flexibility, can be defined as having a fixed part 91 (first portion 61 of the sheath), a flexible part 92 for transverse movement (second portion 62 of the sheath 60) and a flexible part 93 for bending.

FIG. 4 shows the end part of the anchorage 52 of the cable 50 located on the side of the concrete panel 51 opposite to the running part of the cable 50. The end part of the anchorage 52 is fitted with an end cap 53 providing mechanical protection and sealing. This end cap 53 is comprised in the fixed part 91.

In an embodiment, and as shown in FIG. 4, a cylindrical thermal protection cap 5 is used to also protect the end part of the anchorage 52 and its cap 53 against fire or other thermal effects. In the presence of such a cap 5, the fixed part 91 comprises further this thermal protection cap 5.

As shown on the embodiment of FIGS. 7 to 11, the cylindrical thermal protection cap 5 forms a sleeve of circular section, open at one end and closed at the other end. Therefore, the cylindrical thermal cap 5 is formed by a cylindrical wall 6 and an end wall 7 both having the same superposed layers forming a sandwich like wall. These stacked layers form a composite insulation system. A large circular opening 8 is therefore formed at the end of the cylindrical thermal protection cap 5, to allow for introduction over the element to be protected.

In the shown embodiment the composite insulation system is equivalent to the one described for sheath 60 and composed of five layers, previously mentioned as first layer 10, second layer 12, third layer 16, fourth layer 18 and fifth layer 20, from the outermost layer to the innermost layer of the composite insulation system.

In an embodiment the fifth layer 20 forms the interface layer between fabric layers forming said composite insulation system and a frame structure 24 with elements 22. Preferably, said frame structure 24 is a metallic frame. Preferably, said frame structure 24 has circular rings placed along the length of the thermal protection cap 5 and following the inner circumference of the thermal protection cap 5. As an option, said frame structure 24 further comprises sections parallel to each other and extending along the length of the thermal protection cap 5, as illustrated in FIG. 4.

Figure 8:
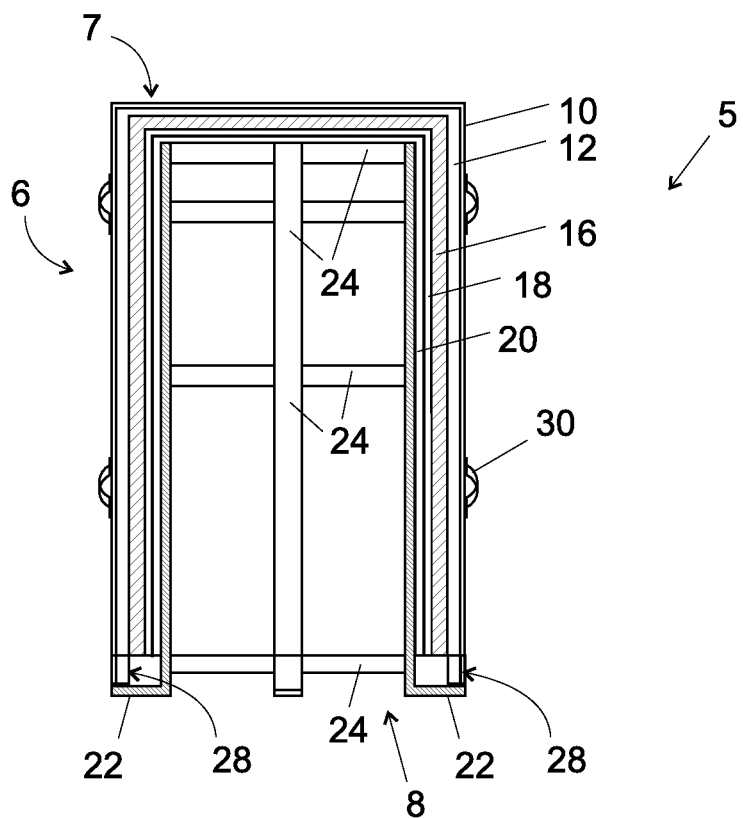
FIG. 8 is a longitudinal sectional view of the cylindrical thermal protection cap of FIG. 7.

FIG. 8 shows the cross-sectional elevation of a complete thermal protection device for the end part of an elongated structural element at installation, namely said cylindrical thermal protection cap 5 and a closure band 28 able to be strapped around the end opening 8 of said cylindrical thermal protection cap 5.

Preferably, in the thermal protection cap 5, and for installation efficiency, the metallic frame 24 is longer than the cylindrical wall of the composite insulation system (layers 10, 12, 16, 18 and 20). In this way, access is provided to the flat-angle brackets 22 for tools used for the attachment of the metallic frame 24. For instance the flat-angle brackets 22 are manufactured with holes to allow for mechanical fixation (for instance with bolts).

Figure 9:
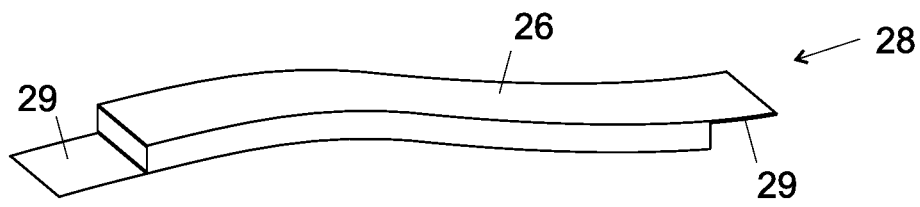
FIG. 9 is a perspective view of a removable closure band used for installation of the cylindrical thermal protection cap of FIGS. 7 and 8.

In an embodiment, said cylindrical thermal protection cap 5 is used with a closure band 28 able to be strapped around the opening 8 of said cylindrical thermal protection cap 5. FIG. 9 illustrates a removable band 28 that fills the void at the end of the thermal protection device post-installation. More precisely, the space formed between the open end of the sleeve (formed by the thermal composition system) and the extremities of the frame (connection elements 22) is closed post-installation with the closure band 28. In an embodiment, the third layer 16 and the fifth layer 20 form the composition of the removable band 28. 26 is an attachment means forming a connection detail such that the removable band 28 is held in place on the thermal protection cap 5 post-installation through tightening around the frame 24. In an embodiment shown in FIG. 3, two ribbon sections 29 are placed at the two ends of the removable band 28 able to be connected together by fixation means (loops and hooks, or other means such as Velcro system (trademark)). There is also a metallic band 26 (FIG. 3) used as a tightening mechanism to hold the removable band 28 around the thermal protection cap 5 in place, as a strapping band.

The removal of band 28 allows for ease of access for the fixation of the thermal protection cap 5, as the flat-angle brackets 22 are not covered by the composite insulation system or any other elements.

Handles 30 are preferably used at the outer surface of the thermal protection cap 5, over the first layer 10, to facilitate the handling of the thermal protection cap 5. Handles are interlayer stitched into layers 10 and 12 for robustness.

Figure 10:
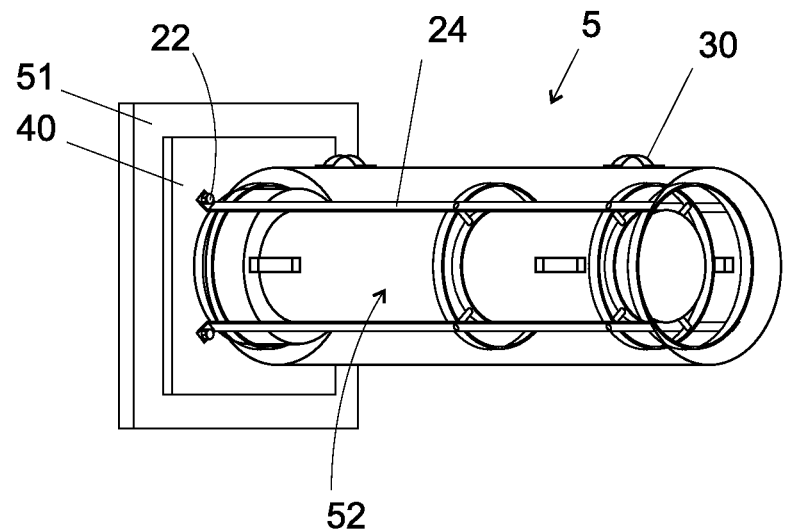
FIG. 10 is a perspective view of a transparent cylindrical thermal protection cap mounted on a stay cable anchorage.
Figure 11:
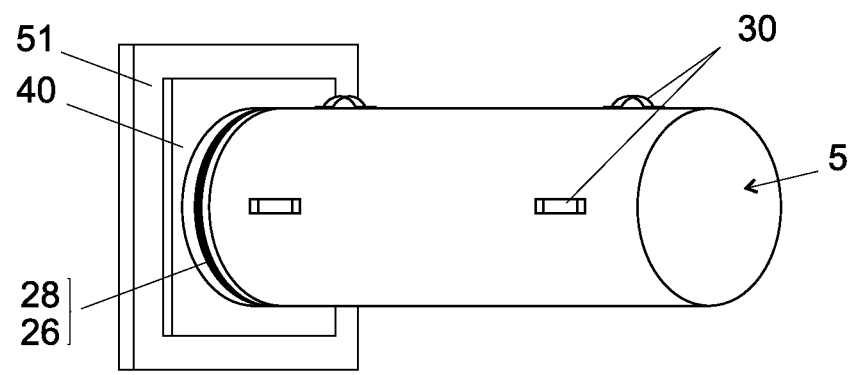
FIG. 11 is a perspective view of a thermal protection cap mounted on a stay cable anchorage, after complete installation.

As shown in FIGS. 10 and 11, the thermal protection device for the end part of an elongated structural element comprises said cylindrical thermal protection cap 5, and preferably comprises further an insulation board 40 with a machined hole. Said insulation board 40 is able to be placed against the opening 8 of said cylindrical thermal protection cap 5, with the hole facing said opening 8. In such a case, the metallic frame 24 is attached to the insulation board 40. In possible embodiments, the insulation board 40 is a calcium silicate board. Such an insulation board 40 is precision machined and is mechanically fixed (for instance bolted) to the protected structure, i.e. the concrete panel 51 from which the anchorage 52 extends towards the right in .FIGS. 10 and 11.

For installation, the metallic frame 24 with the layers 20, 18 and 16 already fixed form a first inner assembly. Then the one-piece cover formed by the first layer 10 and the second layer 12 is engaged around the previously attached first assembly: the cover (first layer 10 and second layer 12) forming a standalone sleeve or outer assembly that is slid over the third layer 16. The entire assembly consisting of the metallic frame and layers 20, 18, 16, 12 and 10 is then installed over the end of the elongated structural element to be protected.

The thermal protection cap 5 can range in sizes depending on the required dimensions of the application. As an example, the thermal protection device has an outer diameter between 200 millimetres and 1000 millimetres, notably about 500 millimetres, and a length of about 500 millimetres to 2000 millimetres or more.

Also, the thermal protection cap 5 can have different shapes depending on the shape of the anchorage 40 and its end cap 52 to be protected, the available space at the location of the anchorage and/or depending on the specific layers used in the composite insulation system of the cylindrical thermal protection cap. In the FIGS. 1 and 2 the first to fifth layers 10, 12, 14, 16, 18 and 20 have a cylindrical wall with a circular section but other section's shape are possible, such as oval, elliptic, rectangular, square, other quadrilateral or more generally other polygonal shapes.

Such a configuration allows the use of the thermal protection sheath 60 and of the thermal protection cap 5 on newly installed and already existing civil engineering structures for retrofitting of the equipment.

The thermal protection sheath 60 and the optional thermal protection cap 5 form a thermal protection device 90 providing a solution for the high-level thermal protection of a length (running part and the end part) of the tensioned cable 50 (or any other structural elongated element) running from the anchorage 52. This thermal protection sheath 60 can efficiently protect the portion of the tensioned cable 50 around which it is wrapped by resisting temperatures of 600° C. or more (up to 800° C., 1000° C. and in some cases 1200° C.) for a time period of more than 30 min, namely up to more than 90 min. Such a high level thermal protection is required to give sufficient time for the arrival of fire response teams before the mechanical resistance of the tensioned cable is reduced to a critical point, for instance on a bridge under traffic where a fire led to a traffic jam which delays the arrival of the fire fighting means, and moreover, this thermal protection sheath 60 provides a low weight solution allowing for a reduced extra weight on the tensioned cable 50, which limits the additional load exerted on the tensioned cable 50 and the overall construction, and also permits the maintenance to parts of the tensioned cable 50 requiring to be controlled since the portions of the thermal protection sheath 60 which need to be taken off can be manual handled, and moreover this thermal protection sheath 60 does not hinder the free movement of the cable by its flexibility.

In the present text is therefore presented an elongated structural device comprising an elongated structural element such as a tensioned cable 50 with at least one anchorage part 52 (including possibly two anchorage parts) at the end(s) of the cable 50, and at least one thermal protection sheath 60, wherein said cylindrical thermal protection sheath 60 covers a length of the cable 50 extending from the anchorage part 52. In a possible embodiment, there is also a cylindrical thermal protection cap 5 covering said anchorage 52.

Preferably, the elongated structural element is an external post-tensioned cable or a stay cable.

In the present text it is therefore presented the use of a cylindrical thermal protection sheath 60 as previously described in a civil engineering structure with elongated structural elements having its ends fixed close to or to one anchorage 52, wherein said thermal protection sheath 60 wraps a length of said elongated structural elements close to at least said anchorage 52. With such a thermal protection sheath 60, is obtained a civil engineering structure, wherein the said cylindrical protection sheath 60 is able to accommodate transverse movements at the transition point between the running length of said elongated structural element (such as the cable 50) and elements rigidly connected to the supported or surrounding civil engineering structure equivalent to angular rotation α at the anchorage 52 (reference point P) up to at least 50 mrad.

REFERENCE NUMBERS USED ON THE FIGURES

1 Thermal protection sheath
2 Wall
3 Opening
4 Joint
4₁ First step
4₂ Second step
5 Cylindrical thermal protection cap
6 Cylindrical wall
7 End wall
8 Opening
10 Outer first layer (metallic outer face)
12 Second layer (fabric made from filament and reinforcement yarns)
14 Stitching
15 Thermal resistant thread
16 Third layer (thermal insulation layer with fibers)
18 Fourth layer (micro-porous thermal insulation material)
20 Fifth layer (structural layer)
22 Flat-angle brackets
24 Frame
26 Attachment means (Metallic band)
28 Closure band (Strapping)
29 Attachment means (ribbon sections)
30 Handle
40 Insulation board
50 Tensioned cable
51 Concrete panel
52 Anchorage
53 End cap
55 Guide pipe
55a Flange
60 Thermal protection sheath
61 First portion
61a Cylindrical space
62 Second portion
62a Annular space
63 Third portion
64 Outer cover
65 Insulation support board
66 Inward flange
70 Guide system
71 Splice joint
72 Damper
73 Outer shell
75 Outer cover
76 Joint
76₁ First step
76₂ Second step
80 Pipe
90 Thermal protection device
91 Fixed part
92 Flexible part for transverse movement
93 Flexible part for bending
100 Deck
P Reference point
α Angle of rotation of deformed sheath
R Radius of deformed sheath

The invention claimed is:

1. Cylindrical thermal protection sheath for covering a length of an elongated structural element, comprising a composite insulation system forming a flexible laminate structure which has a thermal conductivity lower or equal to 0.11 W/m.° C. at 800° C. and a thickness lower than 50 millimeters, said composite insulation system comprises at least:
    an outer first layer having a protective outer face,
    a second layer being a fabric made from filament and reinforcement yarns, said second layer covering the inner side of said outer first layer,
    a third layer covering the inner side of the second layer and comprising a thermal insulation layer essentially made from fibers, and
    a fourth layer covering the inner side of the third layer and being a flexible micro-porous thermal insulation material.

2. Cylindrical thermal protection sheath according to claim 1, wherein said sheath has a maximum weight $W_{max}$ per length unit given by:

$$W_{max} = K \times D$$

with K between 20 to 30, D the smallest inner diameter of said sheath (in m), and $W_{max}$ being in Kg/m.

3. Cylindrical thermal protection sheath according to claim 1, wherein said sheath has a thickness between 20 and 40 millimeters.

4. Cylindrical thermal protection sheath according to claim 1, wherein said sheath can accommodate a transverse movement being equal to D, where D is the internal diameter of the sheath.

5. Cylindrical thermal protection sheath according to claim 1, wherein said sheath flexibility is such that said sheath can be bent so as to define an arc of circle having a radius of about 2 m or more.

6. Cylindrical thermal protection sheath according to claim 1, wherein said sheath has three portions comprising a first cylindrical portion with a first diameter for covering the length of an elongated structural element close to an anchorage, a second portion shaped as a frustrum of a cone and extending from the first cylindrical portion with a lowering diameter, and a third cylindrical portion with a third diameter which is smaller than the first diameter.

7. Cylindrical thermal protection sheath according to claim 1, wherein at least one portion of the sheath is formed by two half shells assembled together in a reversible manner.

8. Cylindrical thermal protection sheath according to claim 1, wherein at least two layers among the first layer, the second layer and the third layer are stitched together.

9. Cylindrical thermal protection sheath according to claim 1, wherein said third layer has a thermal conductivity lower than 0.55 W/m.° C. at 1000° C.

10. Cylindrical thermal protection sheath according to claim 9, wherein said fourth layer is hydrophobic.

11. Cylindrical thermal protection sheath according to claim 1, wherein said third layer comprises an envelope defining separate compartments filled in with said fibers.

12. Cylindrical thermal protection sheath according to claim 1, wherein said fibers of said third layer are made from any of the following materials ceramic, glass or mineral composition.

13. Cylindrical thermal protection sheath according to claim 1, wherein said fourth layer has a thermal conductivity lower than 0.1 W/m.° C. at 800° C.

14. Cylindrical thermal protection sheath according to claim 1, wherein said fourth layer comprises an envelope defining separate compartments filled in with said micro-porous thermal insulation material and wherein said micro-porous thermal insulation material comprises particles.

15. Cylindrical thermal protection sheath according to claim 1, wherein said micro-porous thermal insulation material comprises silica and/or calcium silicate and/or alumina.

16. Cylindrical thermal protection sheath according to claim 1, wherein said composite insulation system further comprises a fifth layer covering the inner side of the fourth layer, attached to the fourth layer and comprising a structural layer.

17. Cylindrical thermal protection sheath according to claim 16, wherein said fifth layer comprises a glass fabric.

* * * * *